(No Model.)

W. W. CAMPEN.
MECHANICAL MOVEMENT.

No. 284,816. Patented Sept. 11, 1883.

WITNESSES:
Thos. Houghton.
W. X. Stevens.

INVENTOR:
W. W. Campen
BY Munn & Co.
ATTORNEYS.

UNITED STATES PATENT OFFICE.

WILLIAM W. CAMPEN, OF WILMINGTON, NORTH CAROLINA.

MECHANICAL MOVEMENT.

SPECIFICATION forming part of Letters Patent No. 284,816, dated September 11, 1883.

Application filed March 12, 1883. (No model.)

*To all whom it may concern:*

Be it known that I, WILLIAM WASHINGTON CAMPEN, a citizen of the United States, residing at Wilmington, in the county of New Hanover and State of North Carolina, have invented a new and useful Mechanical Movement, of which the following is a specification.

This invention relates to that class of mechanical movements which are used for transmitting circular motion; and it has for its object to transmit circular motion to produce circular motion through intermediate reciprocating motion by means of a crank, gear-wheels, eccentrics, levers, ratchets, and ratchet toothed wheels, as hereinafter shown and described, reference being had to the accompanying drawings, in which—

Figure 1:
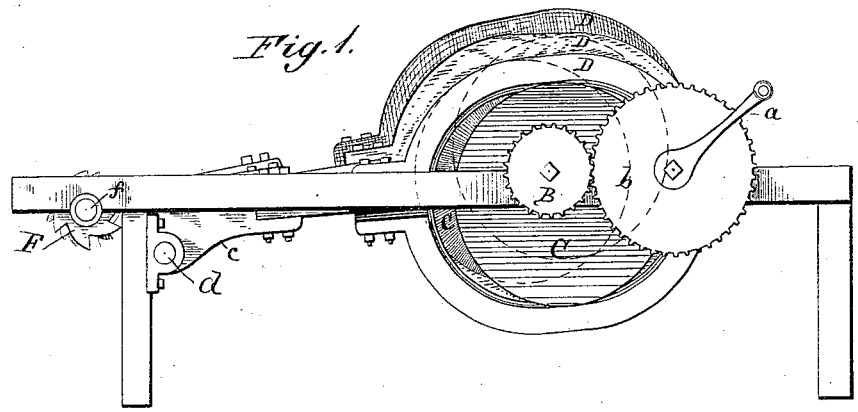
Figure 2:
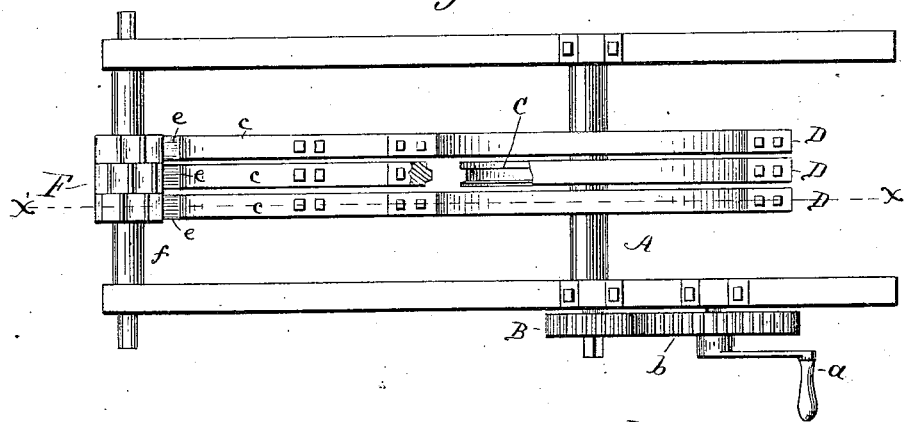
Figure 3:
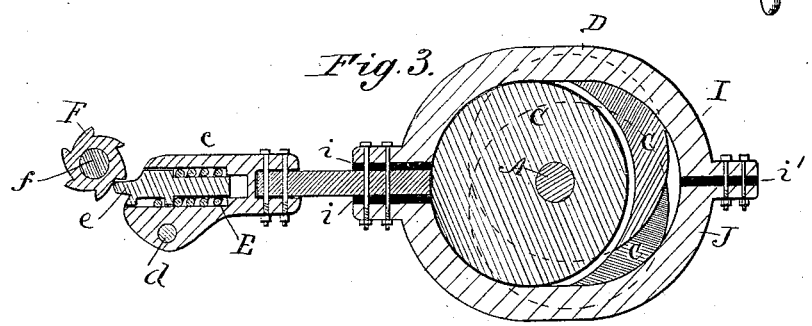

Figure 1 is a side elevation of my mechanical movement. Fig. 2 is a plan view of the same, and Fig. 3 is a longitudinal vertical section at $x$ $x$, Fig. 2.

A represents the shaft of the prime mover, to which power is applied by means of a crank, $a$.

B is a pinion gearing into a larger spur-wheel, $b$, to the shaft of which the crank $a$ may be applied, instead of to shaft A, when it is desired to run said shaft more rapidly—that is to say, one turn of the spur-wheel $b$ causes more than one turn of the pinion B.

C C C are three disk-shaped circular eccentrics, secured upon shaft A to revolve therewith.

$c\ c\ c$ are three levers fulcrumed at $d$, and provided with loops D to receive the eccentrics C, respectively. Each complete revolution of shaft A will move each lever $c$ through its whole range, but the eccentrics are placed equidistant in the circle of revolution—that is, one-third of a circle apart—so their motions are relatively alternate.

E represents three pawls or ratchets, one in the end of each lever $c$, each provided with a spring, E, which acts constantly to press the pawl forward.

F represents three ratchet-wheels secured to shaft $f$, and having teeth engaged by pawls $e$. The reciprocating motion of the levers $c$ causes the pawls $e$ to act alternately against the teeth of wheels F to press them forward, and by means of three or more levers and pawls so applied a reciprocating motion of the pawls produces a continuous rotary motion of shaft $f$. If there were but two pawls acting, they could not produce a continuous motion of shaft $f$, because every pawl has two stationary points, one at each end of its stroke, when its eccentric is on dead-centers, and as they operate in one direction only on wheels F, one of the two pawls would be at its upper extremity at the same time that the other was at its lower extremity of motion. Consequently both would be stationary at once. In supplying a third pawl I bridge over this dead-center point by placing the three operating-eccentrics at thirds of a circle apart, thus having no two on dead-centers at the same time. I further make the united action of the pawls upon the wheels F somewhat differential by making the spaces between the teeth greater than the distance moved by each pawl. Were there but two pawls, the distances between the teeth F would have to be the same or less than the distance moved by each pawl; but my third pawl moves the shaft $f$ forward a little, while the other two are still or drawing back, so that the tooth each pawl is to take has been advanced to meet it.

As a point of mechanical construction, I make the interior of each loop D ribbed V-shaped to enter a corresponding groove in the circumference of its eccentric C, to keep each loop on its own eccentic.

To provide means of adjusting for wear, I separate the loop into two halves, I and J, and when it is new and unworn I place a few thicknesses of packing, $i$—such as sheet-iron or tin—between the rear ends and bolt the parts together. At the forward end I secure the parts I J of the loop to the body $c$ of the lever by means of bolts, inserting the packing $i$ in the joint, as at the rear end. Enough packing will be inserted to leave the eccentric free to revolve, yet a close fit to prevent noise when in rapid motion. When the parts become worn, the packing may be removed.

My invention may be applied whenever it is desired to overcome a continuous resistance to circular motion. For example, a wagon or other vehicle may be propelled by applying one of these machines to each hind wheel, the shaft $f$ representing the axle of the wheel; or if the wheel turns upon the axle, as usual to wagons, the shaft $f$ should be a hollow extension of the wheel-hub; or my device may be readily adapted to use in winding chains, ropes, &c., for lifting purposes—such as in a derrick—or in raising ore or coal for mines. It is especially adapted for this purpose by its peculiar hold upon the winding-shaft $f$, whereby the same is always engaged and the weight cannot revolve the shaft backward, even if the power be removed from the crank $a$.

What I claim as my invention, and wish to secure by Letters Patent, is—

1. Three or more eccentrics secured at equal circular distances apart on a shaft which is provided directly or indirectly with a crank, three or more levers looped upon said eccentrics, each lever having a spring pawl or ratchet engaging the teeth of a ratchet-wheel, said ratchet-wheels being secured to one common shaft, with their corresponding teeth at equal circumferential distances apart, substantially as and for the purpose specified.

2. The crank $a$, the shaft A, three or more eccentrics, C, secured thereon, and three or more levers, $c$, fulcrumed at $d$, and provided with loops D to receive the eccentrics C, the pawls $e$, and springs E, in combination with three or more ratchet-wheels, F, having the teeth of each wheel at equal distances circumferentially from corresponding teeth of the next wheel, and all the wheels secured to one axle, as shown and described.

WILLIAM WASHINGTON CAMPEN.

Witnesses:
W. X. STEVENS,
SOLON C. KEMON.